United States Patent [19]

Hashimoto et al.

[11] 4,400,455
[45] Aug. 23, 1983

[54] LAYERED ORGANIC ELECTROPHOTOGRAPHIC PHOTOCONDUCTOR ELEMENT COMPRISING BISAZO GENERATING AND HYDRAZONE TRANSPORT LAYERS

[75] Inventors: Mitsuru Hashimoto; Kiyoshi Sakai, both of Numazu; Katsunari Ohta, Mishima; Akio Kojima, Hiratsuka, all of Japan

[73] Assignee: Ricoh Company Ltd., Tokyo, Japan

[21] Appl. No.: 325,900

[22] Filed: Nov. 30, 1981

[30] Foreign Application Priority Data

| Dec. 10, 1980 [JP] | Japan | 55-174002 |
|---|---|---|
| Dec. 10, 1980 [JP] | Japan | 55-174003 |
| Dec. 10, 1980 [JP] | Japan | 55-174004 |
| Dec. 10, 1980 [JP] | Japan | 55-174005 |
| Dec. 10, 1980 [JP] | Japan | 55-174006 |
| Dec. 10, 1980 [JP] | Japan | 55-174007 |
| Dec. 10, 1980 [JP] | Japan | 55-174008 |
| Dec. 15, 1980 [JP] | Japan | 55-176921 |

[51] Int. Cl.³ ............................................. G03G 5/06
[52] U.S. Cl. ........................................ 430/59; 430/76; 430/900; 430/78; 430/58
[58] Field of Search .......................... 430/58, 76, 900

[56] References Cited

U.S. PATENT DOCUMENTS

| 4,247,614 | 1/1981 | Ohta et al. | 430/58 |
|---|---|---|---|
| 4,256,821 | 3/1981 | Enomoto | 430/58 |

*Primary Examiner*—John D. Welsh
*Attorney, Agent, or Firm*—Flynn, Thiel, Boutell & Tanis

[57] ABSTRACT

A layered electrophotographic photoconductor whose charge generation layer comprises a bisazo pigment selected from the group consisting of the bisazo pigments represented by the following general formula (1) and whose charge transport layer contains a charge transport material selected from the group consisting of the hydrazone compounds represented by the following general formula (2):

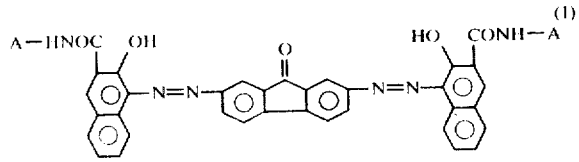

wherein A represents $-C_6H_4-Cl(o)$, $-C_6H_4-Cl(m)$, $-C_6H_4-Br(o)$, $-C_6H_4-Br(m)$, $-C_6H_4-F(o)$, $-C_6H_4-F(m)$, $-C_6H_4-F(p)$, or $-C_6H_4-I(m)$;

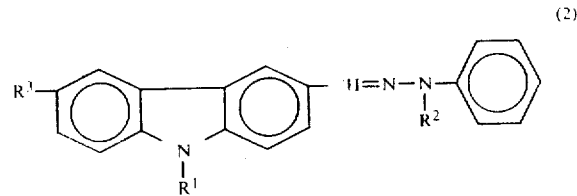

wherein $R^1$ represents a methyl group, an ethyl group, a 2-hydroxyethyl group or a 2-chloroethyl group; $R^2$ represents a methyl group, an ethyl group, a benzyl group or a phenyl group; and $R^3$ represents hydrogen, chloride, bromide, an alkyl group with one to four carbon atoms, an alkoxy group with one to four carbon atoms, a dialkylamino group, or a nitro group.

10 Claims, 1 Drawing Figure

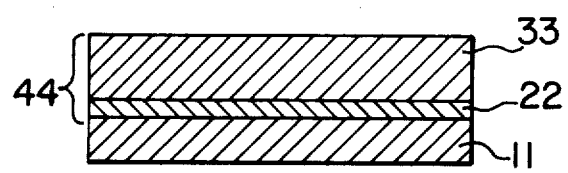

LAYERED ORGANIC ELECTROPHOTOGRAPHIC PHOTOCONDUCTOR ELEMENT COMPRISING BISAZO GENERATING AND HYDRAZONE TRANSPORT LAYERS

BACKGROUND OF THE INVENTION

The present invention relates to a layered electrophotographic photoconductor comprising an electroconductive support material and a photoconductive double layer which consists of a charge generation layer and a charge transport layer. In particular, it is concerned with a layered electrophotographic photoconductor whose charge generation layer comprises a bisazo pigment selected from the group consisting of the bisazo pigments represented by the following general formula (1) and whose charge transport layer contains a charge transport material selected from the group consisting of the hydrazone compounds represented by the following general formula (2):

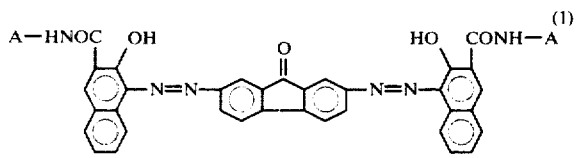

wherein A represents $-C_6H_4-Cl(o)$, $-C_6H_4-Cl(m)$, $-C_6H_4-Br(o)$, $-C_6H_4-Br(m)$, $-C_6H_4-F(o)$, $-C_6H_4-F(m)$, $-C_6H_4-F(p)$, or $-C_6H_4-I(m)$;

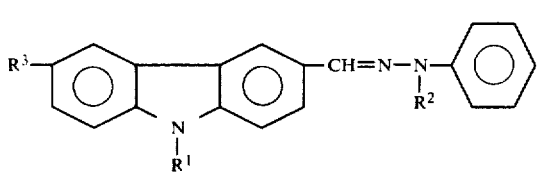

wherein $R^1$ represents a methyl group, an ethyl group, a 2-hydroxyethyl group or a 2-chloroethyl group; $R^2$ represents a methyl group, an ethyl group, a benzyl group or a phenyl group; and $R^3$ represents hydrogen, chloride, bromide, an alkyl group with one to four carbon atoms, an alkoxy group with one to four carbon atoms, a dialkylamino group, or a nitro group.

Conventionally, a variety of inorganic and organic electrophotographic photoconductors are known. As inorganic electrophotographic photoconductors, there are known, for instance, a selenium photoconductor, a selenium-alloy photoconductor, and a zinc oxide photoconductor which is prepared by sensitizing zinc oxide with a sensitizer pigment and dispersing the same in a binder resin. Furthermore, as a representative example of organic electrophotographic photoconductors, an electrophotographic photoconductor comprising a complex of 2,4,7-trinitro-9-fluorenone and poly-N-vinylcarbazole is known.

However, while these electrophotographic photoconductors have many advantages over other conventional electrophotographic photoconductors, at the same time they have several shortcomings from the viewpoint of practical use.

For instance, a selenium photoconductor which is widely used at present has the shortcomings that its production is difficult and, accordingly, its production cost is high, and due to its poor flexibility, it is difficult to work into the form of a belt. Furthermore, it is so vulnerable to heat and mechanical shock that it must be handled with the utmost care.

In contrast to this, the zinc oxide photoconductor is inexpensive since it can be produced more easily than the selenium photoconductor. Specifically, it can be produced by simply coating inexpensive zinc oxide particles on a support material. However, it is poor in photosensitivity, surface smoothness, hardness, tensile strength and wear resistance. Therefore, it is not suitable for a photoconductor for use in plain paper copiers in which the photoconductor is used in quick repetition.

The photoconductor employing the aforementioned complex of 2,4,7-trinitro-9-fluorenone and poly-N-vinylcarbazole is also poor in photosensitivity and is therefore not suitable for practical use, particularly for a high speed copying machine.

Recently, extensive studies have been done on the electrophotographic photoconductors of the above-mentioned types, in order to eliminate the above-described shortcomings of the conventional photoconductors. In particular, attention has focused on layered organic electrophotographic photoconductors, each comprising an electroconductive support layer, a charge generation layer comprising an organic pigment formed on the electroconductive support layer, and a charge transport layer comprising a charge transport material formed on the charge generation layer, which are for use in plain paper copiers, since such layered organic electrophotoconductors have high photosensitivity and stable charging properties. As a matter of fact, some type of layered electrophotographic photoconductors are being successfully used in practice. Examples of the layered electrophotographic photoconductors are as follows:

(1) U.S. Pat. No. 3,871,882 discloses a layered electrophotographic photoconductor whose charge generation layer comprises a perylene derivative and whose charge transport layer comprises an oxadiazole derivative.

(2) Japanese Laid-open Patent Applications No. 52-55643 and No. 52-72231 disclose a layered electrophotographic photoconductor whose charge generation layer comprises Chlorodiane Blue which is dispersed in an organic amine and coated on an electroconductive support material and whose charge transfer layer comprises a pyrazoline derivative.

(3) Japanese Laid-open Patent Application No. 53-95033 discloses a layered electrophotographic photoconductor whose charge generation layer comprises a carbazole type bisazo pigment dispersed, for instance, in tetrahydrofuran and coated on an electroconductive support material, and whose charge transport layer comprises 2,5-bis(4-diethylaminophenyl)-1,3,4-oxadiazole or TNF.

(4) Japanese Laid-open Patent Application No. 54-12742 discloses a layered electrophotographic photoconductor of the same type as that disclosed in Japanese Laid-open Patent Application No. 53-95033, in which the carbazole type bisazo pigment is replaced by an oxadiazole type bisazo pigment.

(5) Japanese Laid-open Patent Application No. 54-22834 also discloses a layered electrophotographic photoconductor of the same type as that disclosed in Japanese Laid-open Patent Application No. 53-95033, in which the carbazole type bisazo pigment is replaced by a fluorenone type bisazo pigment.

As mentioned previously, these layered electrophotographic photoconductors have many advantages over other electrophotographic photoconductors, but at the same time, they have a variety of shortcomings.

Specifically, the electrophotographic photoconductor (1) employing a perylene derivative and an oxadiazole derivative presents no problem for use in an ordinary electrophotographic copying machine, but its photosensitivity is insufficient for use in a high speed electrophotographic copying machine. Furthermore, since the perylene derivative, which is a charge generation material and has the function of controlling the spectral sensitivity of the photoconductor, does not necessarily have spectral absorbance in the entire visible region, this photoconductor cannot be employed for use in color copiers.

The electrophotographic photoconductor (2) employing Chlorodiane Blue and a pyrazoline derivative exhibits comparatively good photosensitivity. However, when preparing that photoconductor, an organic amine, for example, ethylene diamine, which is difficult to handle, is necessary as a coating solvent for forming the charge generation layer.

The electrophotographic photoconductors (3) through (5), for which the inventors of the present invention applied for patents, have an advantage over other conventional electrophotographic photoconductors in that the charge generation layers can be prepared easily by coating the dispersions of fine particles of the pigments in an organic solvent (with addition of a binder resin thereto when necessary) on an electroconductive support material. However, the photosensitivities of the photoconductors (3) through (5) are so low that they cannot be used as photoconductors for high speed electrophotographic copiers.

SUMMARY OF THE INVENTION

It is therefore an object of the present invention to provide a layered electrophotographic photoconductor comprising an electroconductive support material and a photoconductive double layer which consists of a charge generation layer and a charge transport layer, with high photosensitivity and uniform spectral absorbance in the visible region, and which gives rise to no difficulty in production of the electrophotographic photoconductor.

According to the present invention, the charge generation layer comprises a bisazo pigment selected from the group consisting of the bisazo pigments represented by the following general formula (1), and the charge transport layer comprises a charge transport material selected from the group consisting of the hydrazone compounds represented by the following general formula (2):

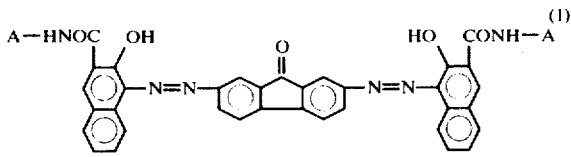
(1)

wherein A represents —$C_6H_4$—Cl(o), —$C_6H_4$—Cl(m), —$C_6H_4$—Br(o), —$C_6H_4$—Br(m), —$C_6H_4$—F(o), —$C_6H_4$—F(m), —$C_6H_4$—F(p), or —$C_6H_4$—I(m);

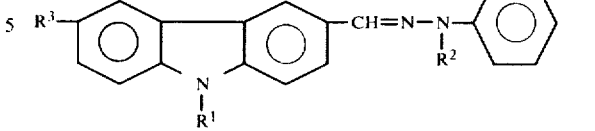
(2)

wherein $R^1$ represents a methyl group, an ethyl group, a 2-hydroxyethyl group or a 2-chloroethyl group; $R^2$ represents a methyl group, an ethyl group, a benzyl group or a phenyl group; and $R^3$ represents hydrogen, chloride, bromide, an alkyl group with one to four carbon atoms, an alkoxy group with one to four carbon atoms, a dialkylamino group, or a nitro group.

According to the present invention, by the layered construction of the charge generation layer and the charge transport layer, which respectively comprises the above-mentioned charge generating material and the charge transporting material, and by the particular combination of the charge generating material and the charge transporting material, there is provided an electrophotographic photoconductor capable of providing high surface potential in the dark and dissipating the surface potential speedily upon exposure to light and without any substantial change in electrophotographic properties during repeated electrophotographic copying, which copying process includes charging, exposure, development and elimination of latent electrostatic images by charge quenching.

BRIEF DESCRIPTION OF THE DRAWING

In the drawing, the single FIGURE shows an enlarged cross section of a layered electrophotographic photoconductor according to the present invention.

DETAILED DESCRIPTION OF THE PREFERRED EMBODIMENTS

Referring to the single FIGURE, there is shown an enlarged cross section of an embodiment of a layered electrophotographic photoconductor according to the present invention. As shown in this FIGURE, a charge generation layer 22 comprising a charge generating material is formed on an electroconductive support material 11, and a charge transport layer 33 comprising a charge transporting material is formed on the charge generation layer 22. The charge generation layer 22 and charge transport layer 33 constitute a photoconductive layer 44 as shown in the FIGURE.

In the thus formed layered electrophotographic photoconductor, a latent electrostatic image is formed by the following mechanism:

The surface of the layered electrophotographic photoconductor is electrically charged uniformly in the dark, so that electric charges are formed in the surface of the photoconductor. The thus electrically charged photoconductor is then exposed to an optical image. When this exposure is done, the rays of light of the optical image pass through the transparent charge transport layer 33 and enter the charge generation layer 22 where the rays of light are then absorbed by the charge generating material present in the charge generation layer 22. Upon absorption of the rays of light, the charge generating material generates charge carriers, which are then injected into the charge transport layer 33. The injected charge carriers are transported towards the surface of the photoconductor through the charge transport layer 33 in accordance with the electric field applied thereto by the first mentioned electric charging, so that electric charges present in the surface of the photoconductor are neutralized, whereby a latent electrostatic image is formed on the surface of the photoconductor.

Referring to the FIGURE, the electroconductive support material 11 for use in the present invention can be made of a plate, drum or foil of metals, such as aluminum, nickel or chromium; a plastic film with a thin layer of aluminum, tin oxide, indium, chromium or palladium; or a sheet of paper or plastic film with an electrically conductive material coated thereon, or impregnated with an electrically conductive material.

The charge generation layer 22 is formed on the electroconductive support material 11 by grinding a bisazo pigment, which works as the charge generating material and which is represented by the formula (1), into fine particles, for instance by a ball mill, and dispersing the fine particles of the bisazo pigment in a solvent, if necessary with the addition of a binder resin to the dispersion, and coating that dispersion on the electroconductive support material 11.

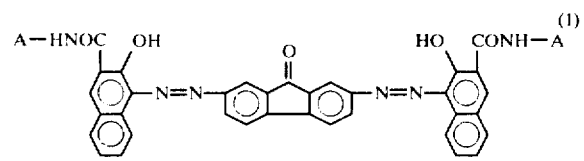

(1)

wherein A represents $-C_6H_4-Cl(o)$, $-C_6H_4-Cl(m)$, $-C_6H_4-Br(o)$, $-C_6H_4-Br(m)$, $-C_6H_4-F(o)$, $-C_6H_4-F(m)$, $-C_6H_4-F(p)$, or $-C_6H_4-I(m)$.

When necessary, the surface of the charge generation layer 22 is made smooth or the thickness of the charge generation layer 22 is adjusted by buffing.

The thickness of the charge generation layer 22 is in the range of 0.01 μm to 5 μm, preferably in the range of 0.05 μm to 2 μm, and the content of the bisazo compound in the charge generation layer 22 is in the range of 10 weight percent to 100 weight percent, preferably in the range of 30 weight percent to 95 weight percent.

When the thickness of the charge generation layer 22 is less than 0.01 μm, the photosensitivity of the electrophotographic photoconductor is insufficient for practical use, while when the thickness of the charge generation layer 22 is more than 5 μm, the charge retention property of this photoconductor becomes poor. Furthermore, when the content of the bisazo pigment in the charge generation layer 22 is less than 10 weight percent, the photoconductor does not exhibit sufficiently high photosensitivity for practical use.

The charge transport layer 33 is formed on the charge generation layer 22 by coating thereon a tetrahydrofuran solution of the hydrazone compound represented by the formula (2) and a binder resin.

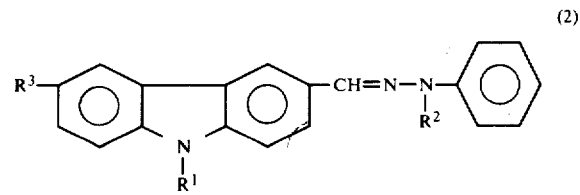

(2)

wherein $R^1$ represents a methyl group, an ethyl group, a 2-hydroxyethyl group or a 2-chloroethyl group; $R^2$ represents a methyl group, an ethyl group, a benzyl group or a phenyl group; and $R^3$ represents hydrogen, chloride, bromide, an alkyl group with one to four carbon atoms, an alkoxy group with one to four carbon atoms, a dialkylamino group, or a nitro group.

The content of the hydrazone compound in the charge transport layer 33 is in the range of 10 weight percent to 80 weight percent, preferably in the range of 25 weight percent to 75 weight percent.

The thickness of the charge transport layer 33 is in the range of 2 μm to 100 μm, preferably in the range of 5 μm to 40 μm.

When the content of the hydrazone compound in the charge transport layer 33 is less than 10 weight percent, the photosensitivity of this photoconductor is poor, while when the content of the hydrazone compound is more than 80 percent, the charge transport layer 33 becomes brittle or the hydrazone compound contained in the charge transport layer 33 separates out in the form of crystals, making the charge transport layer 33 opaque and having adverse effects on the electrophotographic properties of the photoconductor.

When the thickness of the charge transport layer 33 is less than 5 μm, the surface potential cannot be retained properly, while when the thickness of the charge transport layer 33 is more than 40 μm, the residual potential of the photoconductor tends to become too high for practical use.

As the binder resin for use in the charge generation layer 22, a polyester resin, a butyral resin, an ethyl cellulose resin, an epoxy resin, an acrylic resin, a polyvinyliden resin, polystyrene, polybutadiene chloride resin and copolymers of those resins can be used individually or in combinations thereof.

As the binder resin for use in the charge transport layer 33, a polycarbonate resin, a polyester resin, polystyrene, polybutadiene, a polyurethane resin, an epoxy resin, an acrylic resin, a silicone resin and copolymers of those resins can be used individually or in combinations thereof.

Furthermore, in order to improve the flexibility and mechanical strength of the charge transport layer 33, a variety of additives, such as halogenated paraffin, dialkyl phthalate and silicone oil can be added to the charge transport layer 33.

In the present invention, when necessary, a barrier layer can be interposed between the electroconductive support material 11 and the charge generation layer 22, an intermediate layer between the charge generation layer 22 and the charge transport layer 33, or an overcoat layer on top of the charge transport layer 33.

In the present invention, the following bisazo compounds are particularly useful, which are represented by the previously described general formula (1), in combination with one of the following hydrazone compounds represented by the previously described general formula (2) in the above-described layered photoconductor.

Bisazo Compounds
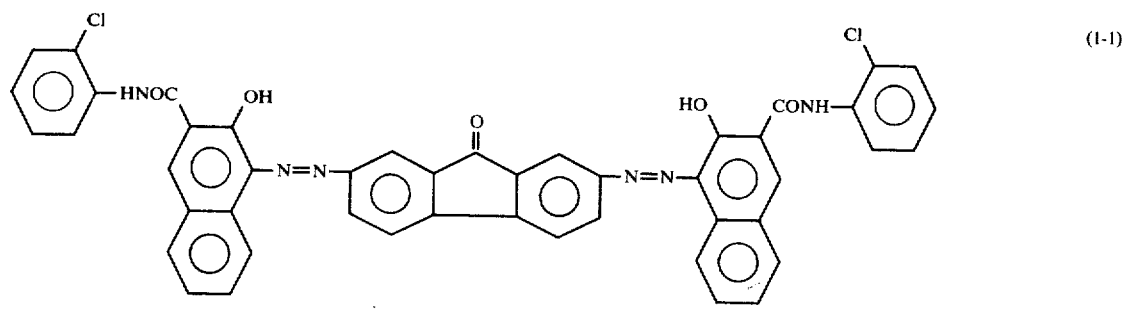
(1-1)
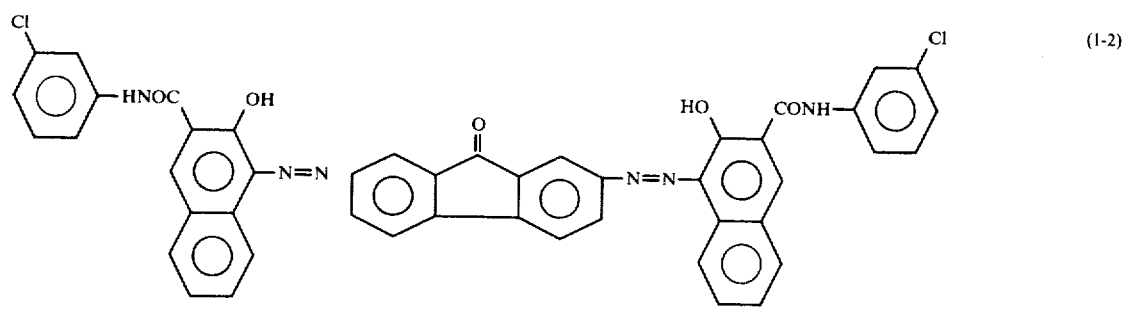
(1-2)
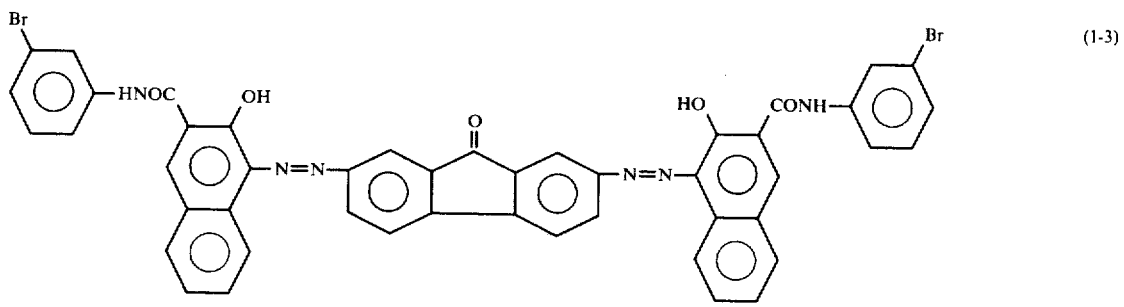
(1-3)
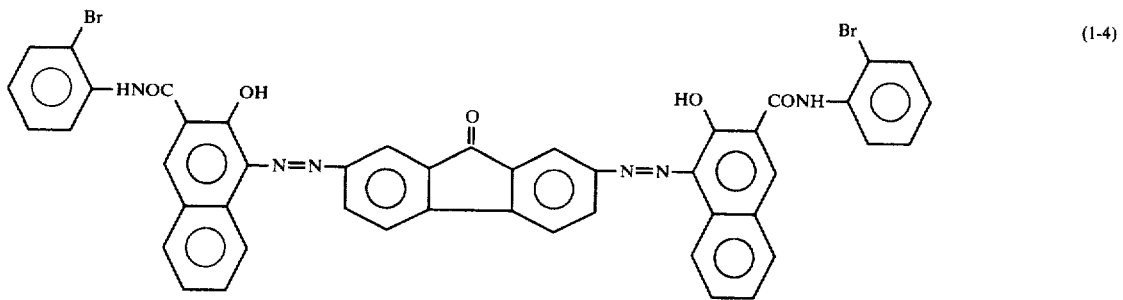
(1-4)
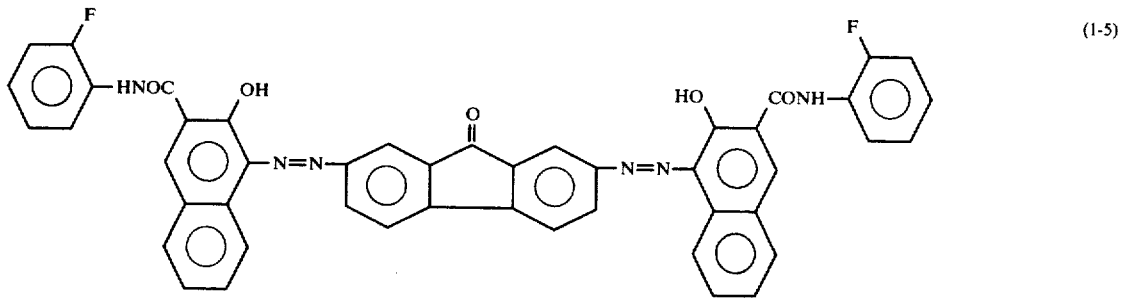
(1-5)

-continued
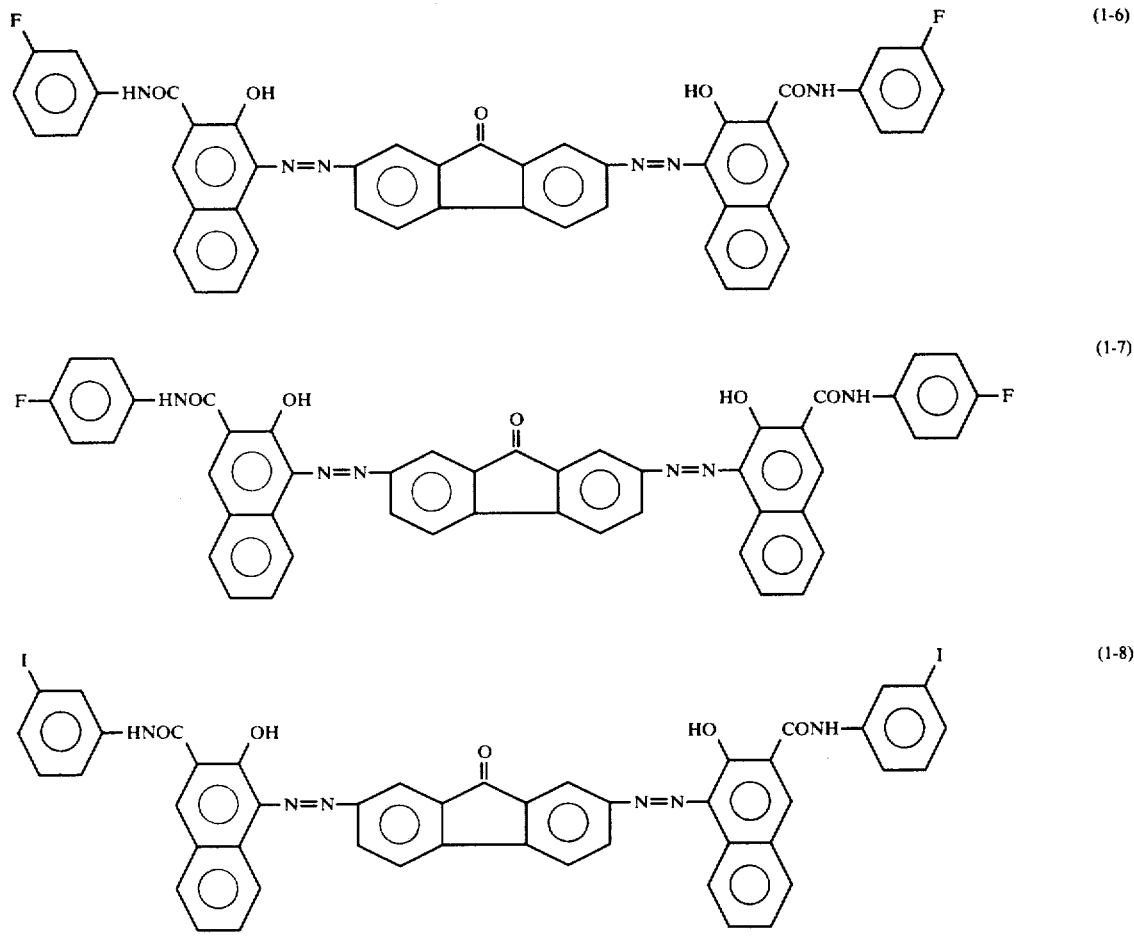
Hydrazone Compounds
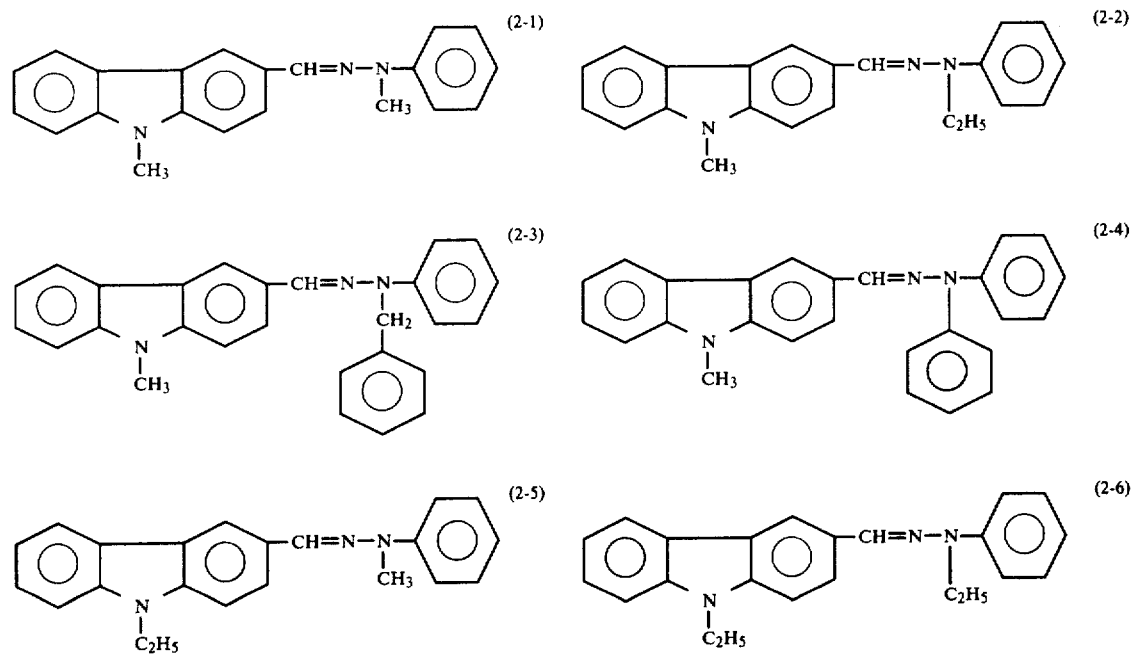

-continued
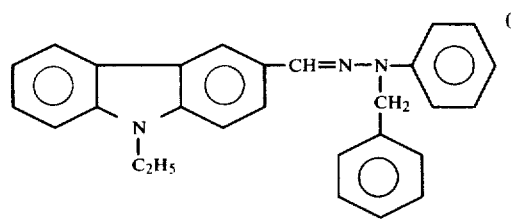 (2-7)
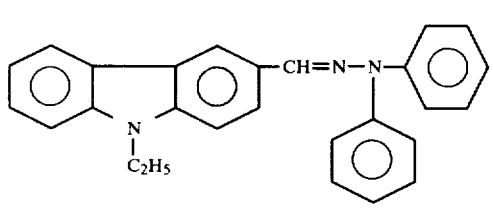 (2-8)
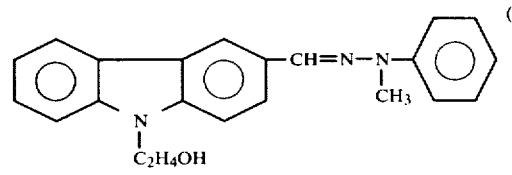 (2-9)
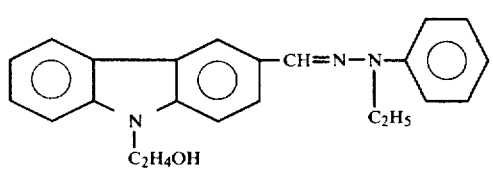 (2-10)
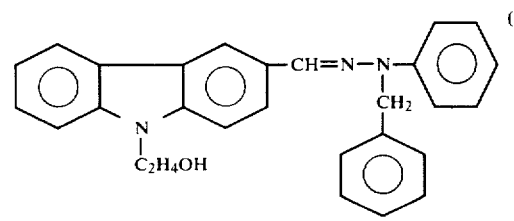 (2-11)
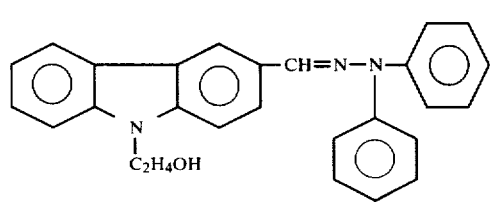 (2-12)
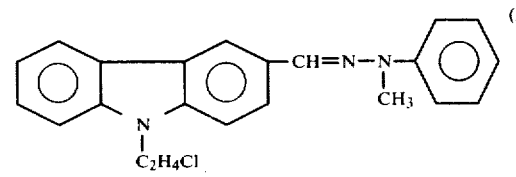 (2-13)
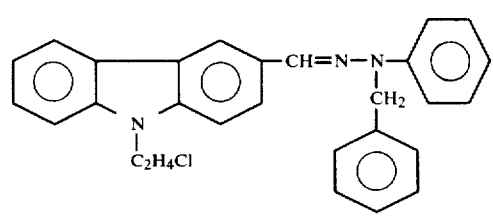 (2-14)
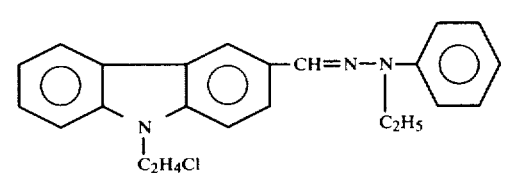 (2-15)
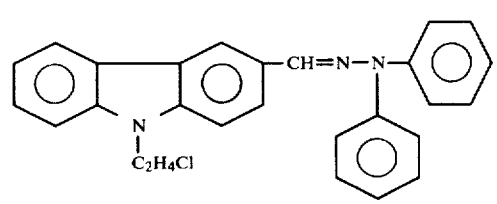 (2-16)
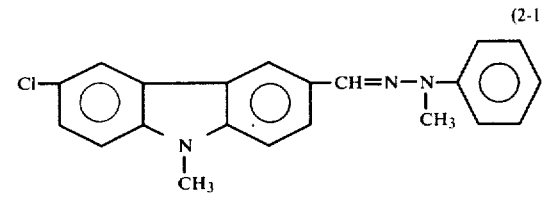 (2-17)
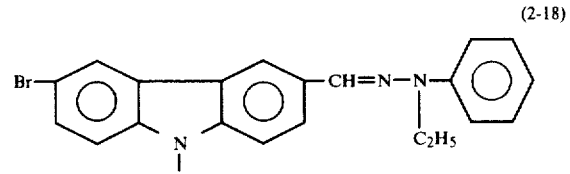 (2-18)
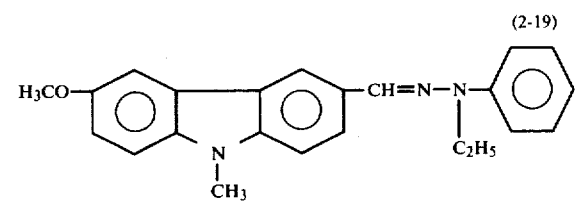 (2-19)
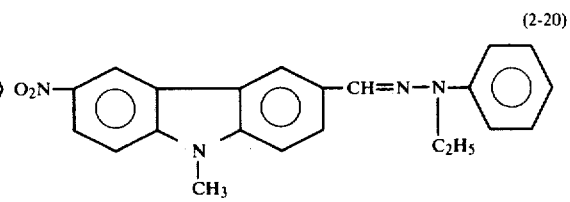 (2-20)

-continued
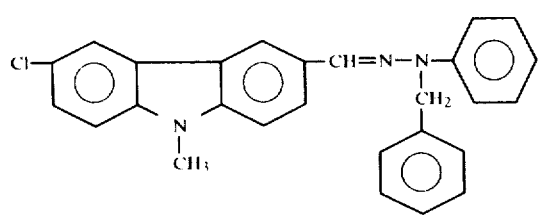
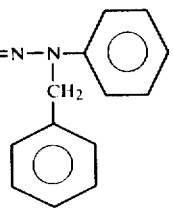
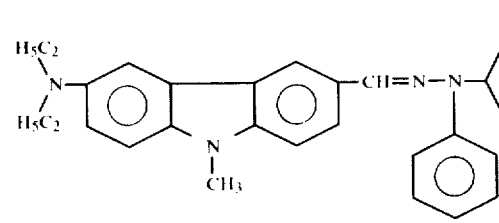
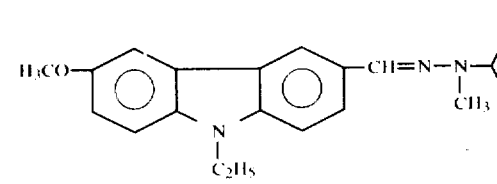
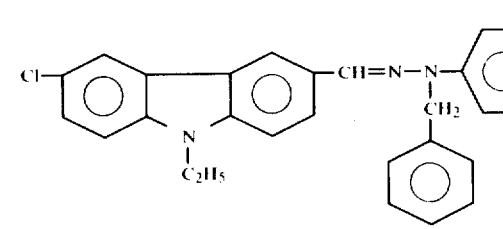
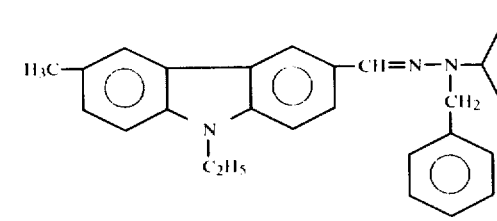
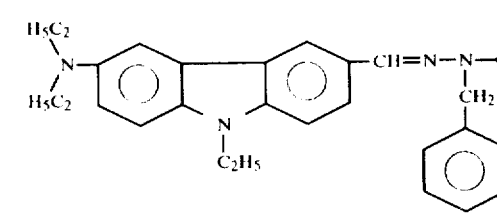
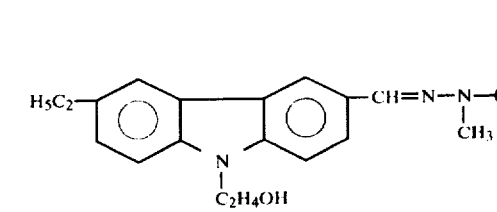

-continued

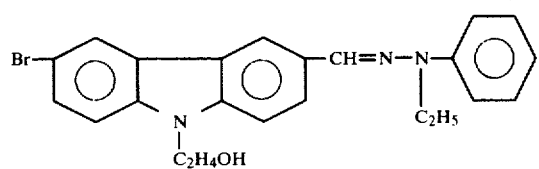
(2-35)

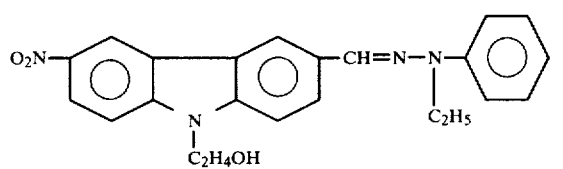
(2-36)

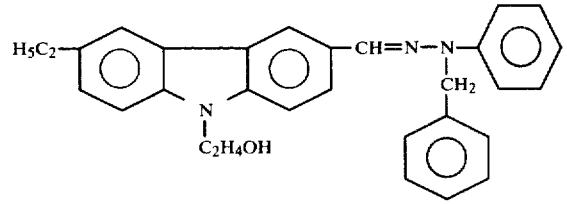
(2-37)

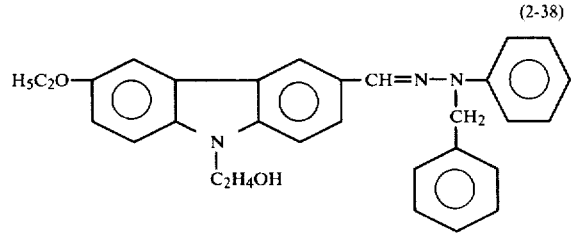
(2-38)

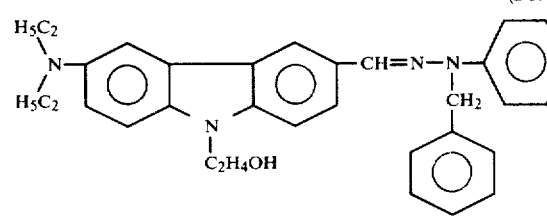
(2-39)

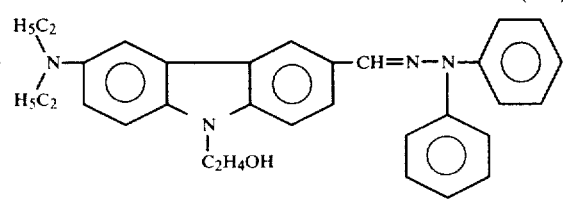
(2-40)

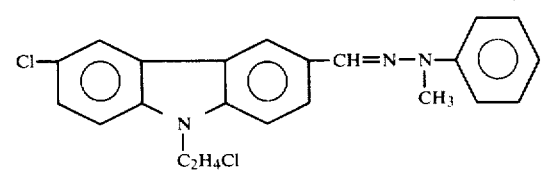
(2-41)

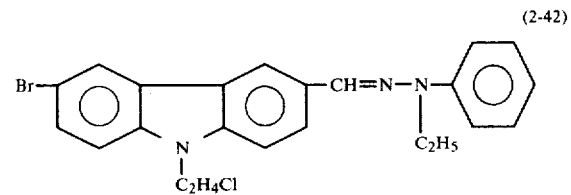
(2-42)

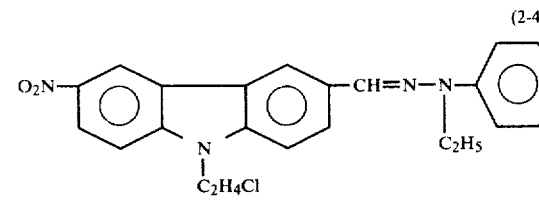
(2-43)

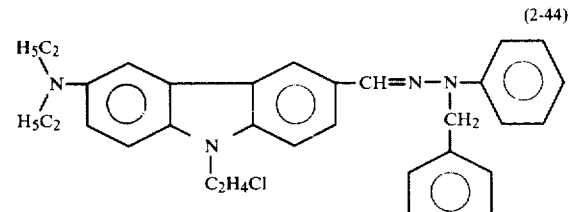
(2-44)

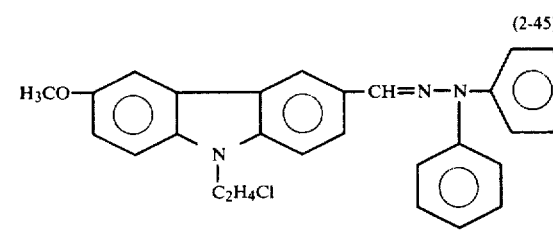
(2-45)

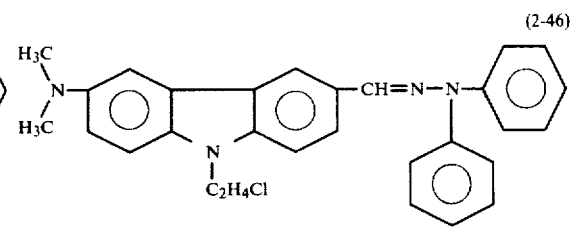
(2-46)

Embodiments of a layered electrophotographic photoconductor according to the present invention will now be explained.

Example 1 (Layered Photoconductor No. 1-1)

One part by weight of a bisazo compound represented by the formula (1-1), 19 parts by weight of tetrahydrofuran, and 6 parts by weight of a tetrahydrofuran solution of a polyvinyl butyral resin (Trade name: XYHL manufactured by Union Carbide Plastic Company) (5 weight percent) were ground in a ball mill. To the thus ground mixture was added, with slow stirring, 104 parts by weight of tetrahydrofuran. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.8 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 18.9 μm was formed on the charge generation layer, whereby a layered electrophotographic photoconductor No. 1-1 was prepared.

Example 2 (Layered Photoconductor No. 1-2)

Example 1 was repeated except that hydrazone compound (2-5) was replaced with hydrazone compound (2-8), so that a layered electrophotographic photoconductor No. 1-2 with a charge generation layer with a thickness of 0.8 μm and a charge transport layer with a thickness of 17.4 μm was prepared.

Example 3 (Layered Photoconductor No. 1-3)

Example 1 was repeated except that hydrazone compound (2-5) was replaced with hydrazone compound (2-7), so that a layered electrophotographic photoconductor No. 1-3 with a charge generation layer with a thickness of 0.8 μm and a charge transport layer with a thickness of 18.1 μm was prepared.

Example 4 (Layered Photoconductor No. 1-4)

Example 1 was repeated except that the polyvinyl butyral resin was replaced with a polyester resin (Trade Name: Vylon 200 manufactured by Toyobo Co., Ltd.), so that a layered electrophotographic photoconductor No. 1-4 with a charge generation layer with a thickness of 0.8 μm and a charge transport layer with a thickness of 18.6 μm was prepared.

Example 5 (Layered Photoconductor No. 2-1)

One part by weight of a bisazo compound represented by the formula (1-2), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.9 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 18.6 μm was formed on the charge generation layer, whereby a layered electrophotographic photoconductor No. 2-1 was prepared.

Example 6 (Layered Photoconductor No. 2-2)

Example 5 was repeated except that the polyester resin was replaced with a polyvinyl butyral resin (Trade Name: XYHL made by Union Carbide Plastic Company), and hydrazone compound (2-5) was replaced with hydrazone compound (2-8), so that a layered electrophotographic photoconductor No. 2-2 with a charge generation layer with a thickness of 0.9 μm and a charge transport layer with a thickness of 18.3 μm was prepared.

Example 7 (Layered Photoconductor No. 2-3)

Example 6 was repeated except that hydrazone compound (2-8) was replaced with hydrazone compound (2-7), so that a layered electrophotographic photoconductor No. 2-3 with a charge generation layer with a thickness of 0.9 μm and a charge transport layer with a thickness of 18.4 μm was prepared.

Example 8 (Layered Photoconductor No. 2-4)

Example 5 was repeated except that the polyester resin was replaced with the polyvinyl butyral resin (Trade Name: XYHX made by Union Carbide Plastic Company), so that a layered electrophotographic photoconductor No. 2-4 with a charge generation layer with a thickness of 0.9 μm and a charge transport layer with a thickness of 15.3 μm was prepared.

Example 9 (Layered Photoconductor No. 3-1)

One part by weight of a bisazo compound represented by the formula (1-3), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.9 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 20.3 μm was formed on the charge generation layer, whereby a layered electrophotographic photoconductor No. 3-1 was prepared.

Example 10 (Layered Photoconductor No. 3-2)

Example 9 was repeated except that hydrazone compound (2-5) was replaced with hydrazone compound (2-8), so that a layered electrophotographic photoconductor No. 3-2 with a charge generation layer with a thickness of 0.8 μm and a charge transport layer with a thickness of 19.1 μm was prepared.

Example 11 (Layered Photoconductor No. 3-3)

Example 9 was repeated except that hydrazone compound (2-5) was replaced with hydrazone compound (2-7), so that a layered electrophotographic photoconductor No. 3-3 with a charge generation layer with a thickness of 0.8 μm and a charge transport layer with a thickness of 19.0 μm was prepared.

Example 12 (Layered Photoconductor No. 3-4)

Example 9 was repeated except that the polyester resin was replaced with the polyvinyl butyral resin (Trade Name: XYHX made by Union Carbide Plastic Company), so that a layered electrophotographic photoconductor No. 3-4 with a charge generation layer with a thickness of 0.8 μm and a charge transport layer with a thickness of 23.1 μm was prepared.

Example 13 (Layered Photoconductor No. 4-1)

One part by weight of the bisazo compound represented by the formula (1-4), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.9 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 part by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 19.3 μm was formed on the charge generation layer, whereby a layered electrophotographic photoconductor No. 4-1 was prepared.

Example 14 (Layered Photoconductor No. 4-2)

Example 13 was repeated except that the polyester resin was replaced with a polyvinyl butyral resin (Trade Name: XYHL made by Union Carbide Plastic Company) and hydrazone compound (2-5) was replaced with hydrazone compound (2-8), so that a layered electrophotographic photoconductor No. 4-2 with a charge generation layer with a thickness of 1.0 μm and a charge transport layer with a thickness of 17.5 μm was prepared.

Example 15 (Layered Photoconductor No. 4-3)

Example 14 was repeated except that hydrazone compound (2-8) was replaced with hydrazone compound (2-7), so that a layered electrophotographic photoconductor No. 4-3 with a charge generation layer with a thickness of 1.0 μm and a charge transport layer with a thickness of 16.9 μm was prepared.

Example 16 (Layered Photoconductor No. 4-4)

Example 13 was repeated except that the polyester resin was replaced with the polyvinyl butyral resin (Trade Name: XYHX made by Union Carbide Plastic Company), so that a layered electrophotographic photoconductor No. 4-4 with a charge generation layer with a thickness of 0.9 μm and a charge transport layer with a thickness of 16.7 μm was prepared.

Example 17 (Layered Photoconductor No. 5-1)

One part by weight of a bisazo compound represented by the formula (1-5), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.9 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 18.7 μm was formed on the charge generation layer, whereby a layered electrophotographic photoconductor No. 5-1 was prepared.

Example 18 (Layered Photoconductor No. 5-2)

Example 17 was repeated except that the polyester resin was replaced with a polyvinyl butyral resin (Trade Name: XYHL made by Union Carbide Plastic Company) and the hydrazone compound (2-5) was replaced with hydrazone compound (2-8), so that a layered electrophotographic photoconductor No. 5-2 with a charge generation layer with a thickness of 0.9 μm and a charge transport layer with a thickness of 18.2 μm was prepared.

Example 19 (Layered Photoconductor No. 5-3)

Example 18 was repeated except that hydrazone compound (2-8) was replaced with hydrazone compound (2-7), so that a layered electrophotographic photoconductor No. 5-3 with a charge generation layer with a thickness of 0.9 μm and a charge transport layer with a thickness of 18.5 μm was prepared.

Example 20 (Layered Photoconductor No. 5-4)

Example 17 was repeated except that the polyester resin was replaced with the polyvinyl butyral resin (Trade Name: XYHX made by Union Carbide Plastic Company), so that a layered electrophotographic photoconductor No. 5-4 with a charge generation layer with a thickness of 0.9 μm and a charge transport layer with a thickness of 18.4 μm was prepared.

Example 21 (Layered Photoconductor No. 6-1)

One part by weight of a bisazo compound represented by the formula (1-6), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.9 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 16.8 μm was formed on the charge generation layer, whereby a layered electrophotographic photoconductor No. 6-1 was prepared.

Example 22 (Layered Photoconductor No. 6-2)

Example 21 was repeated except that the polyester resin was replaced with a polyvinyl butyral resin (Trade Name: XYHL made by Union Carbide Plastic Company) and hydrazone compound (2-5) was replaced with hydrazone compound (2-8), so that a layered electrophotographic photoconductor No. 6-2 with a charge generation layer with a thickness of 0.9 μm and a charge transport layer with a thickness of 19.0 μm was prepared.

Example 23 (Layered Photoconductor No. 6-3)

Example 22 was repeated except that hydrazone compound (2-8) was replaced with hydrazone compound (2-7), so that a layered electrophotographic photoconductor No. 6-3 with a charge generation layer with a thickness of 0.9 μm and a charge transport layer with a thickness of 17.2 μm was prepared.

Example 24 (Layered Photoconductor No. 7-1)

One part by weight of a biaszo compound represented by the formula (1-7), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.9 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 18.4 μm was formed on the charge generation layer, whereby a layered electrophotographic photoconductor No. 7-1 was prepared.

Example 25 (Layered Photoconductor No. 7-2)

Example 24 was repeated except that hydrazone compound (2-5) was replaced with hydrazone compound (2-8), so that a layered electrophotographic photoconductor No. 7-2 with a charge generation layer with a thickness of 0.9 μm and a charge transport layer with a thickness of 16.8 μm was prepared.

Example 26 (Layered Photoconductor No. 7-3)

Example 24 was repeated except that hydrazone compound (2-8) was replaced with hydrazone compound (2-7), so that a layered electrophotographic photoconductor No. 7-3 with a charge generation layer with a thickness of 0.9 μm and a charge transport layer with a thickness of 17.4 μm was prepared.

Example 27 (Layered Photoconductor No. 7-4)

Example 25 was repeated except that the polyester resin was replaced with the polyvinyl butyral resin (Trade Name: XYHX made by Union Carbide Plastic Company), so that a layered electrophotographic photoconductor No. 7-4 with a charge generation layer with a thickness of 0.9 μm and a charge transport layer with a thickness of 22.1 μm was prepared.

Example 28 (Layered Photoconductor No. 8-1)

One part by weight of a bisazo compound represented by the formula (1-8), 19 parts by weight of tetrahydrofuran, and 6 parts by weight of a tetrahydrofuran solution of a polyester resin (Trade Name: Vylon 200 made by Toyobo Co., Ltd.) (5 weight percent) were ground in a ball mill.

To the thus ground mixture was added 104 parts by weight of tetrahydrofuran while stirring slowly. The thus prepared dispersion was coated on the aluminum surface side of an aluminum-evaporated polyester film by a doctor blade, with a wet gap of 35 μm, and was then dried at 80° C. for 5 minutes, whereby a charge generation layer with a thickness of 0.8 μm was formed on the aluminum-evaporated polyester film.

Furthermore, 10 parts by weight of hydrazone compound (2-5), 10 parts by weight of a polycarbonate resin (Trade Name: Panlite K-1300 made by Teijin Limited), 0.002 parts by weight of silicone oil (Trade Name: KF-50 made by The Shin-Etsu Chemical Co., Ltd.) and 80 parts by weight of tetrahydrofuran were mixed to form a solution. This solution was coated on the charge generation layer by a doctor blade with a wet gap of 200 μm and was then dried at 80° C. for 2 minutes and then at 100° C. for 5 minutes, so that a charge transport layer with a thickness of 18.7 μm was formed on the charge generation layer, whereby a layered electrophotographic photoconductor No. 8-1 was prepared.

Example 29 (Layered Photoconductor No. 8-2)

Example 28 was repeated except that the polyester resin was replaced with a polyvinyl butyral resin (Trade Name: XYHL made by Union Carbide Plastic Company) and hydrazone compound (2-5) was replaced with hydrazone compound (2-8), so that a layered electrophotographic photoconductor No. 8-2 with a charge generation layer with a thickness of 0.8 μm and a charge transport layer with a thickness of 17.6 μm was prepared.

Example 30 (Layered Photoconductor No. 8-3)

Example 28 was repeated except that hydrazone compound (2-8) was replaced with hydrazone compound (2-7), so that a layered electrophotographic photoconductor No. 8-3 with a charge generation layer with a thickness of 0.8 μm and a charge transport layer with a thickness of 18.2 μm was prepared.

Example 31 (Layered Photoconductor No. 8-4)

Example 28 was repeated except that the polyester resin was replaced with the polyvinyl butyral resin (Trade Name: XYHX made by Union Carbide Plastic Company), so that a layered electrophotographic photoconductor No. 8-4 with a charge generation layer with a thickness of 0.8 μm and a charge transport layer with a thickness of 18.9 μm was prepared.

The thus prepared electrophotographic photoconductors were each charged negatively in the dark under application of −6 kV of corona charge for 20 seconds and the surface potential Vs (Volt) of each photoconductor was measured by a Paper Analyzer (Kawaguchi Works, Model SP-428). Each photoconductor was then allowed to stand in the dark for 20 seconds without applying any charge thereto, and the surface potential Vo (Volt) of the photoconductor was measured by the Paper Analyzer. Each photoconductor was then illuminated by a tungsten lamp in such a manner that the illuminance on the illuminated surface of the photoconductor was 20 lux, and the exposure $E_{\frac{1}{2}}$ (lux.second) required to reduce the initial surface potential Vo (Volt) to $\frac{1}{2}$ was measured. The exposure E1/10 (lux.second) required to reduce the initial surface potential Vo (Volt) to 1/10 was also measured. The results are shown in Table 1.

In order to illustrate the advantages of the present invention, the following comparative layered photoconductors were prepared:

Comparative Example 1 (Comparative Layered Photoconductor No. 1)

In a vacuum chamber with a vacuum degree of $10^{-5}$ mmHg, an aluminum base plate was placed above N,N'-dimethylperylene-3,4,9,10-tetracarboxyldiimide, which served as a charge generating material, in an evaporation source. The N,N'-dimethylperylene-3,4,9,10-tetracarboxyldiimide was heated to 350° C. and evaporation was permitted to continue for 3 minutes to form a charge generation layer on the aluminum base plate.

A solution consisting of 5 parts by weight of 2,5-bis(4-diethylaminophenyl)-1,3,4-oxadiazole, 5 parts by weight of a polyester resin (Trade Name: Polyester Adhesive 49000 manufactured by Du Pont) and 90 parts by weight of tetrahydrofuran) was coated on the charge generation layer and was dried at 120° C. for 5 minutes, so that a charge transport layer with a thickness of about 10 μm was formed on the charge generation layer, whereby a comparative layered photoconductor No. 1 was prepared.

Comparative Example 2 (Comparative Layered Photoconductor No. 2)

1.08 parts by weight of Chlorodiane Blue (a benzidine type pigment), which served as a charge generating material, was dissolved in 24.46 parts by weight of ethylenediamine. To this solution was added 20.08 parts by weight of n-butylamine with stirring and 54.36 parts by weight of tetrahydrofuran was then added, whereby a charge generation layer coating liquid was prepared. The charge generation layer coating liquid was coated on the aluminum surface side of an aluminum-evaporated film by a doctor blade, and was then dried at 80° C. for 5 minutes, whereby a charge generation layer with a thickness of about 0.5 μm was formed on the aluminum-evaporated polyester film.

A solution of 1 part by weight of 1-phenyl-3-(4-diethylaminostyryl)-5-(4-diethylaminophenyl)-pyrazoline, 1 part by weight of polycarbonate resin (Trade Name: Panlite K-1300 made by Teijin Limited) and 8 parts by weight of tetrahydrofuran was coated on the above-described charge generation layer by a doctor blade and then dried at 80° C. for 2 minutes and then at 100° C. for 5 minutes, so that a charge transport layer with a thickness of 20 μm was formed on the charge generation layer, whereby a comparative layered photoconductor No. 2 was prepared.

Comparative Example 3 (Comparative Layered Photoconductor No. 3)

Two parts by weight of 2,7-bis[2-hydroxy-3-(2,4-dimethoxy-5-chlorophenylcarbamoyl)-1-naphthylazo]-9-fluorenone, which served as charge generating material, and 98 parts by weight of tetrahydrofuran were ground in a ball mill to form a dispersion. This dispersion was coated on the aluminum surface side of an aluminum-evaporated polyester film by a doctor blade and was then dried at room temperature, whereby a charge generation layer with a thickness of 1 μm was formed on the aluminum-evaporated polyester film.

Two parts by weight of 2,5-bis(4-diethylaminophenyl)-1,3,4-oxadiazole, 2 parts by weight of a polycarbonate resin (Trade Name: Panlite L made by Teijin Limited) and 46 parts by weight of tetrahydrofuran were mixed to obtain a charge transport layer coating solution. This solution was coated on the above-described charge generation layer by a doctor blade and was then dried at 120° C. for 10 minutes, so that a charge transport layer with a thickness of 10 μm was formed on the charge generation layer, whereby a comparative layered photoconductor No. 3 was prepared.

Comparative Example 4 (Comparative Layered Photoconductor No. 4)

One part by weight of a polyester resin (Trade Name: Polyester Adhesive 49000 made by Du Pont), 1 part by weight of 2,7-bis[2-hydroxy-3-(4-chlorophenylcarbamoyl)-1-naphthylazo]-9-fluorenone, which was a fluorenone type bisazo pigment, and 26 parts by weight of tetrahydrofuran were ground in a ball mill to obtain a dispersion.

This dispersion was coated on the aluminum surface side of an aluminum-evaporated polyester film by a doctor blade and was then dried at 100° C. for 10 minutes to form a photoconductive layer with a thickness of 7 μm on the aluminum-evaporated polyester film, whereby a comparative layered photoconductor No. 4 was prepared.

The electrostatic characteristics of those comparative photoconductors were measured under the conditions stated in the examples of the electrophotographic photoconductors according to the present invention. The results are shown in Table 2.

TABLE 1

| Photoconductor | Vpo (Volt) | E1/2 (lux.sec) | E1/10 (lux.sec) |
|---|---|---|---|
| No. 1-1 | −771 | 0.9 | 1.8 |
| No. 1-2 | −862 | 0.9 | 1.9 |
| No. 1-3 | −888 | 0.9 | 1.8 |
| No. 2-1 | −682 | 0.9 | 2.3 |
| No. 2-2 | −794 | 1.4 | 2.8 |
| No. 2-3 | −812 | 1.0 | 2.4 |
| No. 2-4 | −574 | 1.6 | 3.0 |
| No. 3-1 | −603 | 1.1 | 2.5 |
| No. 3-2 | −750 | 1.1 | 2.6 |
| No. 3-3 | −762 | 1.1 | 2.5 |
| No. 3-4 | −550 | 1.7 | 3.1 |
| No. 4-1 | −466 | 1.0 | 2.1 |
| No. 4-2 | −472 | 1.5 | 3.1 |
| No. 4-3 | −459 | 1.5 | 3.0 |
| No. 4-4 | −412 | 1.4 | 2.9 |
| No. 5-1 | −829 | 1.9 | 3.7 |
| No. 5-2 | −823 | 1.9 | 3.9 |
| No. 5-3 | −817 | 1.9 | 3.8 |
| No. 5-4 | −812 | 2.0 | 3.9 |
| No. 6-1 | −532 | 1.3 | 2.7 |
| No. 6-2 | −680 | 1.6 | 3.5 |
| No. 6-3 | −705 | 1.5 | 3.2 |
| No. 7-1 | −727 | 1.5 | 3.1 |
| No. 7-2 | −832 | 1.5 | 3.3 |
| No. 7-3 | −855 | 1.5 | 3.1 |
| No. 7-4 | −900 | 1.5 | 3.4 |
| No. 8-1 | −495 | 1.0 | 2.5 |
| No. 8-2 | −507 | 1.3 | 2.9 |
| No. 8-3 | −528 | 1.2 | 2.7 |
| No. 8-4 | −522 | 1.1 | 2.6 |

TABLE 2

| Comparative Photoconductor | Vpo (Volt) | E1/2 (lux.sec) | E1/10 (lux.sec) |
|---|---|---|---|
| No. 1 | −960 | 5.4 | 27.0 |
| No. 2 | −603 | 1.9 | 4.1 |
| No. 3 | −993 | 5.1 | 11.0 |
| No. 4 | −114 | 9.6 | 39.2 |

As can be seen from Table 1 and Table 2, the layered electrophotographic photoconductors according to the present invention have a higher photosensitivity and a lower residual surface potential than the comparative photoconductors No. 1 through No. 4.

The photoconductors according to the present invention were each mounted in a commercially available electrophotographic copying machine Ricopy P-500 (made by Ricoh Company, Ltd.) and copying was repeated 10,000 times. Clear copies were made by all the layered photoconductors according to the present invention. This demonstrated that those photoconductors had also excellent durability in repeated use.

What is claimed is:

1. In a layered electrophotographic photoconductor comprising an electroconductive support material and a photoconductive double layer which consists of a charge generation layer and a charge transport layer, the improvement wherein:

a. said charge generation layer comprises a charge generating material selected from the group consisting of bisazo pigments of the formula

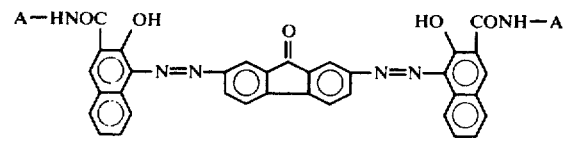

wherein A represents —$C_6H_4$—Cl(o), —$C_6H_4$—Cl(m), —$C_6H_4$—Br(o), —$C_6H_4$—Br(m), —$C_6H_4$—F(o), —$C_6H_4$—F(m), —$C_6H_4$—F(p), or —$C_6H_4$—I(m); and b. said charge transport layer comprises a charge transporting material selected from the group consisting of the hydrazone compounds of the formula

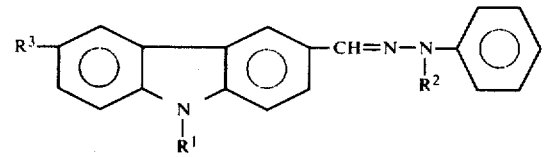

wherein $R^1$ represents a methyl group, an ethyl group, a 2-hydroxyethyl group or a 2-chloroethyl group; $R^2$ represents a methyl group, an ethyl group, a benzyl group or a phenyl group; and $R^3$ represents hydrogen, chloride, bromide, an alkyl group with one to four carbon atoms, an alkoxy group with one to four carbon atoms, a dialkylamino group, or a nitro group.

2. A layered electrophotographic photoconductor as claimed in claim 1, wherein said charge generating material is

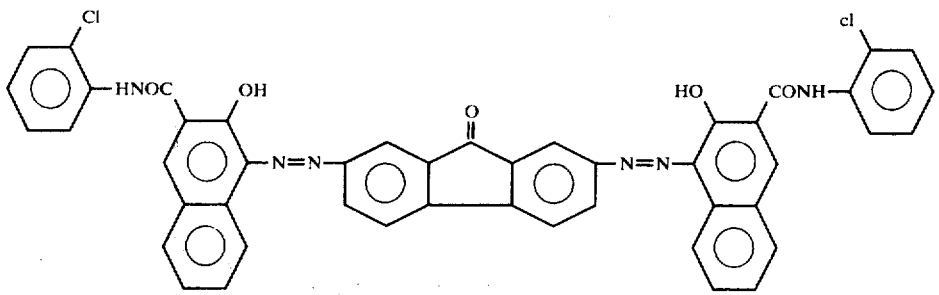

3. A layered electrophotographic photoconductor as claimed in claim 1, wherein said charge generating material is

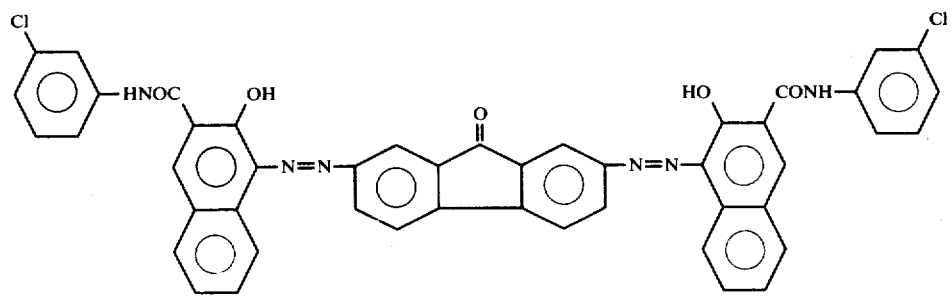

4. A layered electrophotographic photoconductor as claimed in claim 1, wherein said charge generating material is

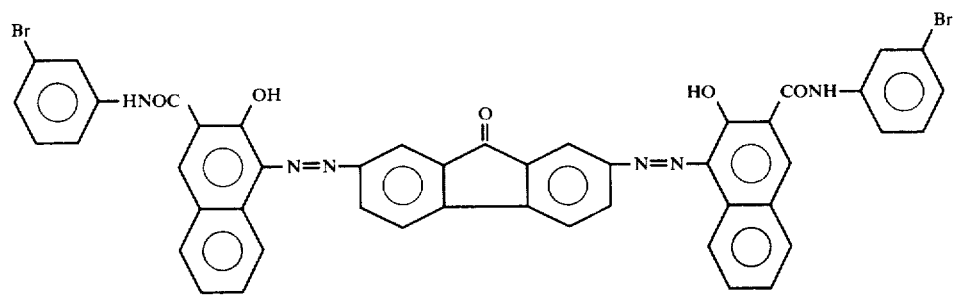

5. A layered electrophotographic photoconductor as claimed in claim 1, wherein said charge generating material is

6. A layered electrophotographic photoconductor as claimed in claim 1, wherein said charge generating material is

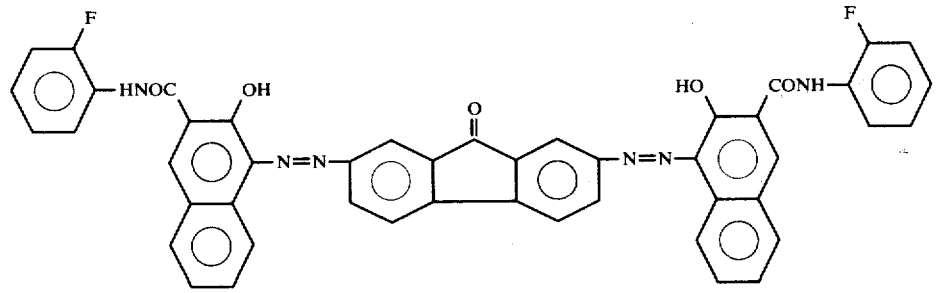

7. A layered electrophotographic photoconductor as claimed in claim 1, wherein said charge generating material is

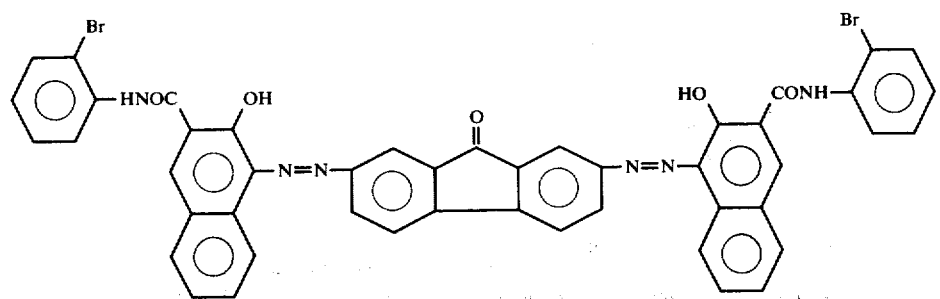

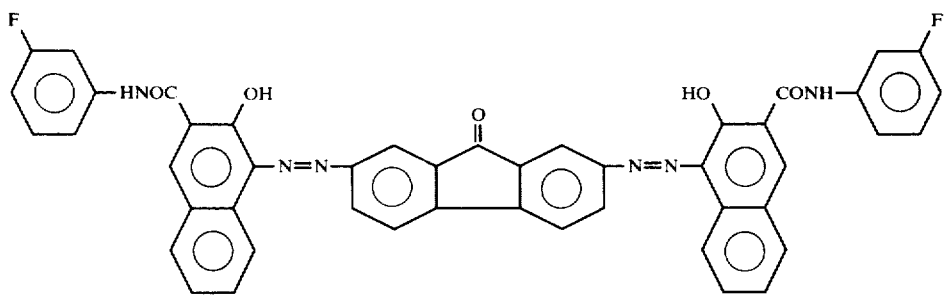

8. A layered electrophotographic photoconductor as claimed in claim 1, wherein said charge generating material is

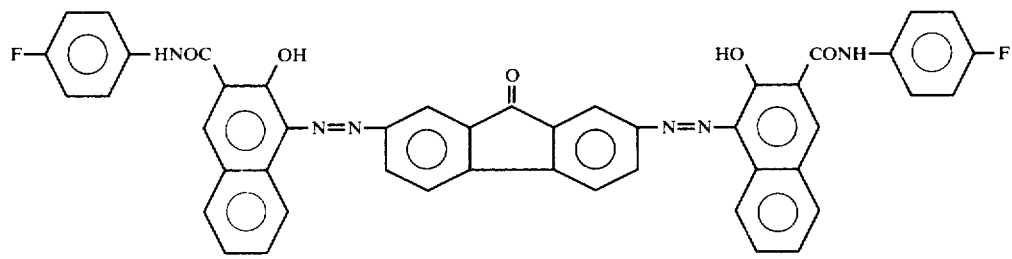

9. A layered electrophotographic photoconductor as claimed in claim 1, wherein said charge generating material is

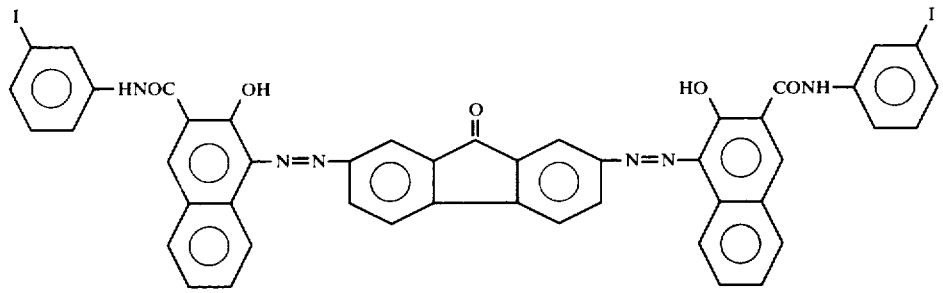

10. A layered electrophotographic photoconductor as claimed in claim 1, wherein the thickness of said charge generation layer is in the range of 0.01 μm to 5 μm and the content of said bisazo pigment in said charge generation layer is in the range of 10 to 100 weight percent and the thickness of said charge transport layer is in the range of 2 μm to 100 μm and the content of said hydrazone compound in said charge transport layer is in the range of 25 to 75 weight percent.

* * * * *